(12) United States Patent
Yellin

(10) Patent No.: US 7,185,314 B2
(45) Date of Patent: Feb. 27, 2007

(54) ADAPTIVE MECHANISM FOR OPTIMALLY ACCESSING DATA BASED UPON DATA ACCESS CHARACTERISTICS

(75) Inventor: Daniel M. Yellin, Monsey, NY (US)

(73) Assignee: International Business Machines Corporation, Armonk, NY (US)

(*) Notice: Subject to any disclaimer, the term of this patent is extended or adjusted under 35 U.S.C. 154(b) by 623 days.

(21) Appl. No.: 10/448,597

(22) Filed: May 30, 2003

(65) Prior Publication Data

US 2004/0243987 A1 Dec. 2, 2004

(51) Int. Cl.
*G06F 9/45* (2006.01)
(52) U.S. Cl. ..................................... 717/106
(58) Field of Classification Search ................ 717/151, 717/106
See application file for complete search history.

(56) References Cited

U.S. PATENT DOCUMENTS

| | | | | |
|---|---|---|---|---|
| 5,345,578 | A | 9/1994 | Manasse | 395/425 |
| 5,425,129 | A | 6/1995 | Garman | 395/2.65 |
| 5,734,922 | A | 3/1998 | Hagersten | 395/800.37 |
| 6,578,068 | B1* | 6/2003 | Bowman-Amuah | 709/203 |
| 2002/0075803 | A1* | 6/2002 | Zaharychuk et al. | 370/231 |

OTHER PUBLICATIONS

Daniel M. Yellin, "Competitive Algorithms for the Dynamic Selection of Component Implementations," Apr. 22, 2002.
D. M. Yellin, "Competitive Algorithms for the Dynamic Selection of Component Implementations," IBM Systems Journal, vol. 42, No. 1, (2003).

* cited by examiner

*Primary Examiner*—John Chavis
(74) *Attorney, Agent, or Firm*—Michael J. Buchenhorner; Casey P. August

(57) ABSTRACT

A runtime system, program product and method for determining a mode of operation for a software component, comprises steps of a) running in a first implementation mode; b) determining a first cost associated with running in the first implementation mode; c) determining a second cost associated with switching to a second implementation and running in the second implementation mode; and d) comparing the first cost with the second cost; and e) providing a recommendation to switch to the second mode based on the comparison of the first cost with the second cost. According to another embodiment a deterministic 3-competitive algorithm is used to solve this problem. We also show that this matches the lower bound, as any deterministic algorithm cannot be better than 3-competitive. According to another embodiment a probabilistic algorithm is also used to solve this problem as well.

19 Claims, 5 Drawing Sheets

```
Impl1Cost := 0;  Impl2Cost := 0; MinDelta := 0;
TimeToSwitch := false;
While (not TimeToSwitch) {
    Process next request r;
    Impl1Cost := Impl1Cost + Cost(r,impl1);
    Impl2Cost := Impl2Cost + Cost(r,impl2);
    Temp := Impl1Cost - Impl2Cost;
    MinDelta := minimum(MinDelta,Temp);
        If ((Impl1Cost - Impl2Cost - MinDelta) > = K)
            {TimeToSwitch := true;}
}
Switch to impl2;
```

*FIG. 5*

ADAPTIVE MECHANISM FOR OPTIMALLY ACCESSING DATA BASED UPON DATA ACCESS CHARACTERISTICS

FIELD OF THE INVENTION

The invention disclosed broadly relates to the field of optimization of computer programs, and more particularly relates to a system and method for determining a mode of operation for a software component.

BACKGROUND OF THE INVENTION

Middleware is an increasingly ubiquitous part of most computing infrastructures. Optimizing middleware is therefore becoming increasingly important. The increasing popularity of component based programming models such as JavaBeans™ and Web services makes desirable the optimal use of software components. The optimization problem becomes acute where different components come from different vendors and run in different environments. Because switching between different implementations or modes can incur a heavy cost on a system there is a need for good algorithms for determining at runtime when to switch implementations or modes.

One key feature in many middleware systems is known as "pub/sub," short for publication and subscription service. This allows loosely coupled systems to maintain copies of data for fast access and uses a notification mechanism for propagating changes to data from one system to another. However, it is often difficult for system builders to decide at design time whether to employ pub/sub or to use a centralized data repository. Which will provide best performance is hard to know up front, and often there is no correct answer—each design will be optimal under certain workloads.

Consider a data server that serves information (e.g., records) from a data base to many clients. The server and each client exist on separate nodes of the network. Each client can perform either a read or a write on the data. Each client can exist in either one of two modes: a subscription mode or a non-subscription mode. In the latter case, for each read that the client wants to perform, it must send a message to the server and receive a reply back. In subscription mode, however, a client caches a local copy (or replica) of the data base. All reads of the data base go against this local copy. In either case, writes must still go to the server. Upon receiving a write update from any client, the server must inform all subscribers of the change to the data.

Middleware exists today to facilitate both modes of the operation, with the subscription mode handled by "pub/sub" middleware. The optimality of each mechanism is dependent upon the nature of the workload. To see why this is true, consider a client who mostly reads data. It will be optimal for that client to have a local copy of the data, thereby limiting the number of network messages he must send to the server. If a client C is mostly idle or mostly writing data, however, having a local copy of the data means that each time a different client updates the data the server must send a network message notifying the client C of this update. Hence in this case there is less network traffic if C is in non-subscription mode.

Because it is often impossible to statically predict the read/write behavior of clients, and because their behavior changes over time, there is a need for an adaptive pub/sub strategy which does not require a client to permanently use either subscription or non-subscription mode, but that can flexibly switch between modes depending upon current workloads.

Given a server and a set of clients performing read and write operations, each client decides in an online fashion, based only upon the messages it has seen so far, whether to switch to subscription or non-subscription mode. An optimal strategy is one that minimizes network traffic. Therefore, there is a need for a method that overcomes the shortcomings of the prior art.

SUMMARY OF THE INVENTION

Briefly, according to the invention a runtime method for determining a mode of operation or implementation mode for a software component, comprises steps or acts of a) running in a first implementation mode; b) determining a first cost associated with operating in the first implementation mode; c) determining a second cost associated with switching to a second implementation mode and operating in the second implementation mode; d) comparing the first cost with the second cost; and e) providing a recommendation to switch to the second mode or to stay in the first mode based on the comparison of the first cost with the second cost. A software component is a piece of software with a well-defined interface; it can be as large as an application program or as small as an object.

The precise criteria for determining the merits of switching mode of implementation or operation can be established at design time or dynamically at run time. For example, it may be useful to provide a threshold of cost savings to warrant a change of modes. An example of a criterion for changing mode is when the first cost exceeds the second cost by the cost of switching from one mode to another mode and switching back. Once the decision to switch modes is made, the system can do so immediately (i.e., stopping all other processing) or gradually over a period of time to enhance performance (i.e., the switch does not interrupt other processing being done by the system). The decision to switch modes can be made either at the server or at a client.

According to another embodiment a deterministic 3-competitive algorithm is used to solve this problem. According to another embodiment a probabilistic algorithm is also used to solve this problem as well. According to another embodiment the invention can be used to solve the dynamic pub/sub problem to optimize network traffic.

According to another embodiment of the invention, the adaptive component concept is applied to data structure selection. The invention is thus used for optimizing runtime performance.

BRIEF DESCRIPTION OF THE DRAWINGS

FIG. 5 gives a description of the Delta algorithm, which is a fast way of computing when to switch.

DESCRIPTION OF PREFERRED EMBODIMENTS

Figure 1:
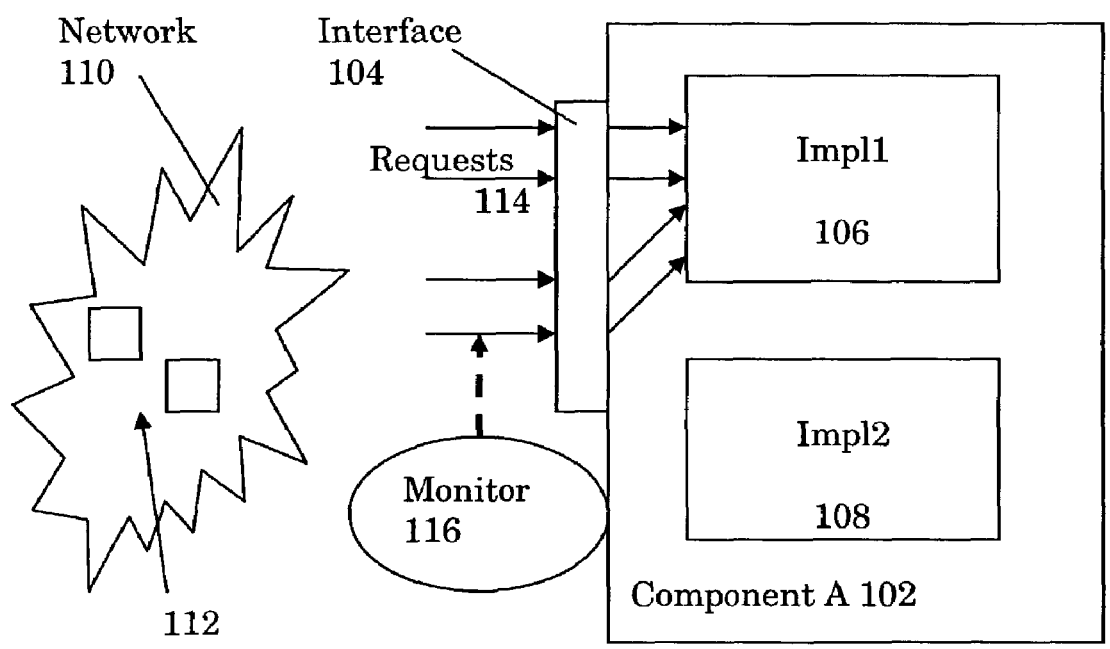
FIG. 1 shows a client/server system according to an embodiment of the invention.

Referring to FIG. 1, there is shown an embodiment of the invention wherein a software component (Component A) 102 comprises at least a first implementation (Impl1 106) and a second implementation (Impl2 108). According to this embodiment, a data processing system 100 comprises Component A 102 that provides a service, in the form of an interface 104. This interface 104 describes the various operations performed by Component A 102. Component A can have multiple implementations to process the request. Only one implementation is active at any given time. FIG. 1 also shows a network 110 containing components 112 sending requests 114 to be processed by component A 102, and a monitor 116, observing each request received by component A 102.

Other components 112 in the network 110 issue requests for component A to perform these operations via component A's interface 104. Component A 102 uses impl1 106 to process requests 114, and therefore all requests 114 received by Component A 102 are processed by impl1 106.

The monitor 116 observes the requests being received by component A 102. If it determines that the processing of these requests 114 would be improved if component A 102 used impl2 108 to process the requests, the monitor informs component A to switch its implementation from impl1 to impl2. Component A then switches to impl2, so that future requests are processed by impl2 108 instead of impl1 106. Sometime in the future the monitor 116 may inform Component A 102 to switch back to impl1 108. The monitor 116 may be part of component A 102 itself, or the monitor 116 may be provided by the system 100 upon which component A 102 executes.

To determine which implementation is best to process the requests, the monitor 116 preferably determines the cost incurred by having a sub-sequence of requests processed by impl1 106, as well as the cost that would have been incurred by having these requests processed by impl2 108. The monitor 116 will tell component A 102 to switch to impl2 108 if the cost of processing the requests 114 in impl1 exceeds the sum of the cost of processing the requests in impl2 108 and a constant K. The subsequence used for comparing the cost of processing requests in implementation impl1 to the cost of processing these requests in implementation impl2 may be determined by comparing a fixed number of requests or a variable number of requests over a fixed period of time. For optimality, the algorithm also supports the following mechanism: let $r\_1, \ldots, r\_n$ be all the requests processed by Component A since it started using implementation impl1. If there exists an integer j, where j is between 1 and n, such that the cost of processing requests $r\_j, \ldots, r\_n$ in implementation impl1 is greater than the sum of the cost of processing these requests in impl2 and the constant K, then the monitor informs Component A to switch to implementation impl2.

The value of the constant K may be pre-determined, or may be derived empirically by observing system behavior and inferring the optimal value. The value of K may also be given probabilistically. If K1 is defined to be the cost of Component A 102 to switch from impl1 106 to impl2 108, and K2 defined to be the cost of Component A 102 to switch from impl2 108 to impl1 106, then we can fix the constant K to be the sum of K1 and K2. Using this value for K, the system 100 is close to 3-competitive and close to optimal. The meaning of 3-competitive is discussed in Yellin, "Competitive Algorithms for the Dynamic Selection of Component Implementations, IBM Systems Journal, Vol. 42, No. 1 (2003), the contents of which are incorporated by reference.

The cost measured by the monitor 116 (the value the monitor is trying to minimize) may be resources consumed, such as CPU resources, memory resources, network bandwidth, or some other metric, such as latency, security violations observed, or other quality metrics. The cost measured by the monitor may be some combination of these elementary costs.

The cost to process each request can be determined empirically by the monitor, or can be based upon an operation cost matrix provided by the application provider to the monitor. An example of an operation cost matrix is given in Table 1A.

TABLE 1A

|     | Impl1       | Impl2       |
|-----|-------------|-------------|
| Op A | Cost_1_A   | Cost_2_A   |
| Op B | Cost_1_B   | Cost_2_B   |
| ... | ...         | ...         |
| Op Z | Cost_1_Z   | Cost_2_Z   |

To determine when to switch from one impl1 to impl2, using one of the methods discussed above, the monitor must also know the cost to switch from one implementation to the other. This can be determined empirically by the monitor, or can be based upon a switch cost matrix provided by the application provider to the monitor. An example of a switch cost matrix is given in Table 1B.

TABLE 1B

|       | Impl1           | Impl2           |
|-------|-----------------|-----------------|
| Impl1 | —               | SwitchCost_1_2  |
| Impl2 | SwitchCost_2_1  | —               |

FIG. 5 gives a description of the Delta algorithm, which is a fast way of computing when to switch. In FIG. 5, given a request r, Cost(r, impl1) gives cost to process request r in impl1. This can be computed by simply doing a lookup in the operation cost matrix. Similarly, Cost(r,impl2) gives cost to process request r in impl2. In this algorithm, after each request is processed, the algorithm updates some simple counters, Impl1Cost, Impl2Cost, and MinDelta. It then checks if the value of Impl1Cost−Impl2Cost−MinDelta is greater or equal to the constant K. If so, it determines that it is time to switch to implementation impl2. Otherwise it stays in implementation impl1. The value for constant K was discussed above. The Delta algorithm given here is a fast way of implementing the algorithm described in paragraph above.

Figure 2:
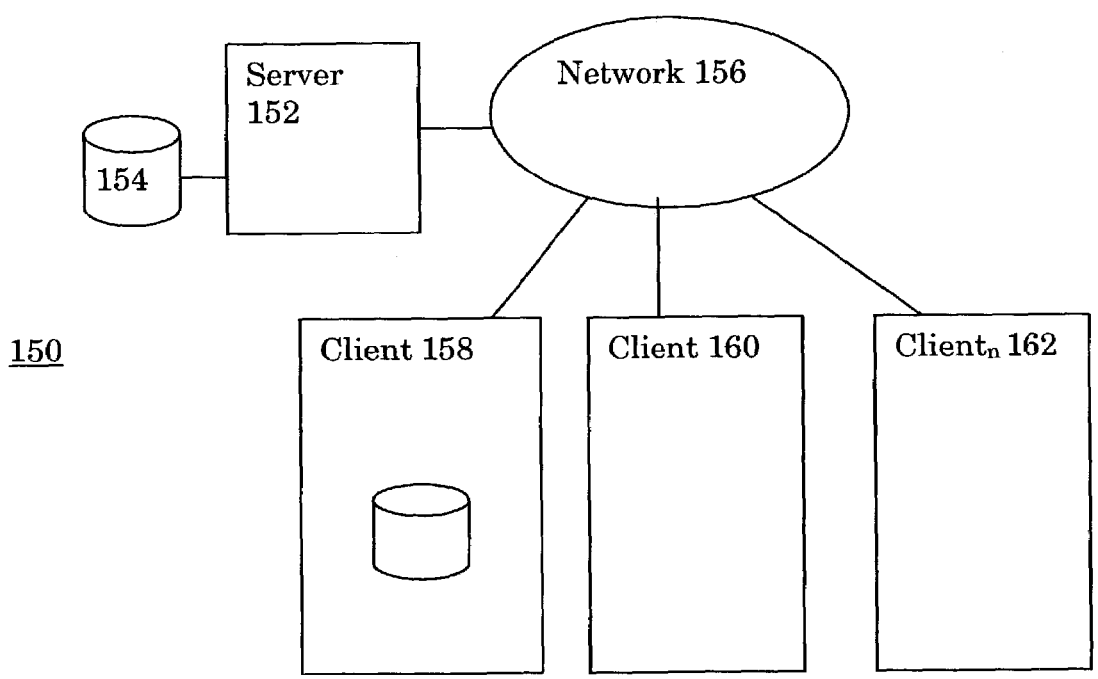
FIG. 2 shows a dynamic pub/sub system according to another embodiment of the invention.

Referring to FIG. 2, there is shown a block diagram of an information handling system 150 illustrating an embodiment of the invention wherein software components are used in a pub/sub environment. The system 150 comprises a server 152, a database 154 coupled to the server 152, a network 106 (such as an Ethernet), and clients 158–162. A first client 158 is currently operating in a subscription mode. Hence client 158 uses a local replica 159 of the data base 154. The replica is local in that the client 108 maintains it for fast access. The second client 160 is currently operating in a non-subscription mode. Thus, it does not host a copy of the database 154. Instead it transmits requests for service, from the server 152, that identify the requested data. In response, the server 152 sends records satisfying the request. As discussed above, operating in either mode is not always optimal. According to the invention, software components are dynamically adaptive to the operating conditions such that an optimal mode of operations is used. According to an embodiment of the invention, there is provided an adaptive approach to pub/ sub, allowing the middleware to dynamically change implementation modes at a client from pub/sub (or subscription) mode to centralized data access (non-subscription), and vice versa, depending on system workloads or costs of operation. We define this mechanism and consider optimal algorithms, where optimality is defined by minimizing the amount of network traffic.

We assume that the server 152 contains (or controls) a data base 154 comprising p-1 records. Each client can perform one of the following operations:

read(r): this operation generates a request message from the client to the server requesting record r, and a message back from the server delivering record r.

localRead(r): this operation reads record r from a local copy of the data. It is valid only if the client is in subscription mode.

write(r): this operation generates a message from the client to the server writing record r.

subscribes( ): this operation generates a message from the client to the server subscribing to the data base, and a message from the server delivering a local copy of the data base to the client. It puts the client into subscription mode.

unsubscribe: this operation generates a message from the client to the server un-subscribing the client. It puts the client in non-subscription mode, and discards the local copy of the data base.

Additionally the server may initiate one message to a client on its own: update(r): this message is from the server to each client in subscription mode delivering the new value of record r. This message is sent by the server after a write operation has been performed updating record r.

The clients 158–162 each comprise at least one software component that uses the data services of the server 102. As used herein, the term "data base" means some collection of data items, where each item can individually be read from and written to the data base.

We assume a reliable transport mechanism that delivers all messages in the order that they are sent. Note that in this embodiment the write operation is an asynchronous operation with no confirmation of completion. In this case we assume that after the first client 158 issues a write operation, it can assume that the operation will complete. In this case, after the client 158 sends the write message, it can also update the local copy of the data base 154 if it is in subscription mode. One can also defer updating the local copy of the data base 154 until the server sends an update message confirming that this update has taken place. In this case, however, the client 108 may read an inconsistent value from the local copy 159. An alternate semantic is to make the write operation a synchronous operation, where the server 102 sends back a message confirming whether the write operation completed successfully or not.

The cost of an operation is proportional to the number of messages it generates and their size. Hence the write, unsubscribe, and update operations each have unit costs. The read operation has a cost of two, because it consists of a message and its reply, each of unit size. The subscribe operation has a cost of p because it consists of a request message of unit size and a reply of size p-1. A localRead operation has zero cost because it generates no network messages. Table 2 below is an exmaple of a table for cost matrix.

TABLE 2

| Operation | Subscription (impl1) cost | Non-subscription (impl2) cost |
| --- | --- | --- |
| read_A | 0 | 2 |
| read_B | 0 | 0 |
| write_A | 2 | 1 |
| write_B | 1 | 0 |

We assume that the clients 158–162 and server 152 are loosely coupled in the following sense: each client reads and writes data independent of any other client. There is no synchronization between clients 158–162. More formally, for any given "run," there is a linear order on how each client will read and write records, but there is no order on the possible interleavings of reads and writes between individual clients. In a preferred embodiment, each client represents a software component such as those used in JavaBeans or Web services. Thus each component is adaptive in that it has several implementations (e.g., in a subscription or non-subscription mode). The server 152 is a shared data repository that supports either mode.

Figure 3:
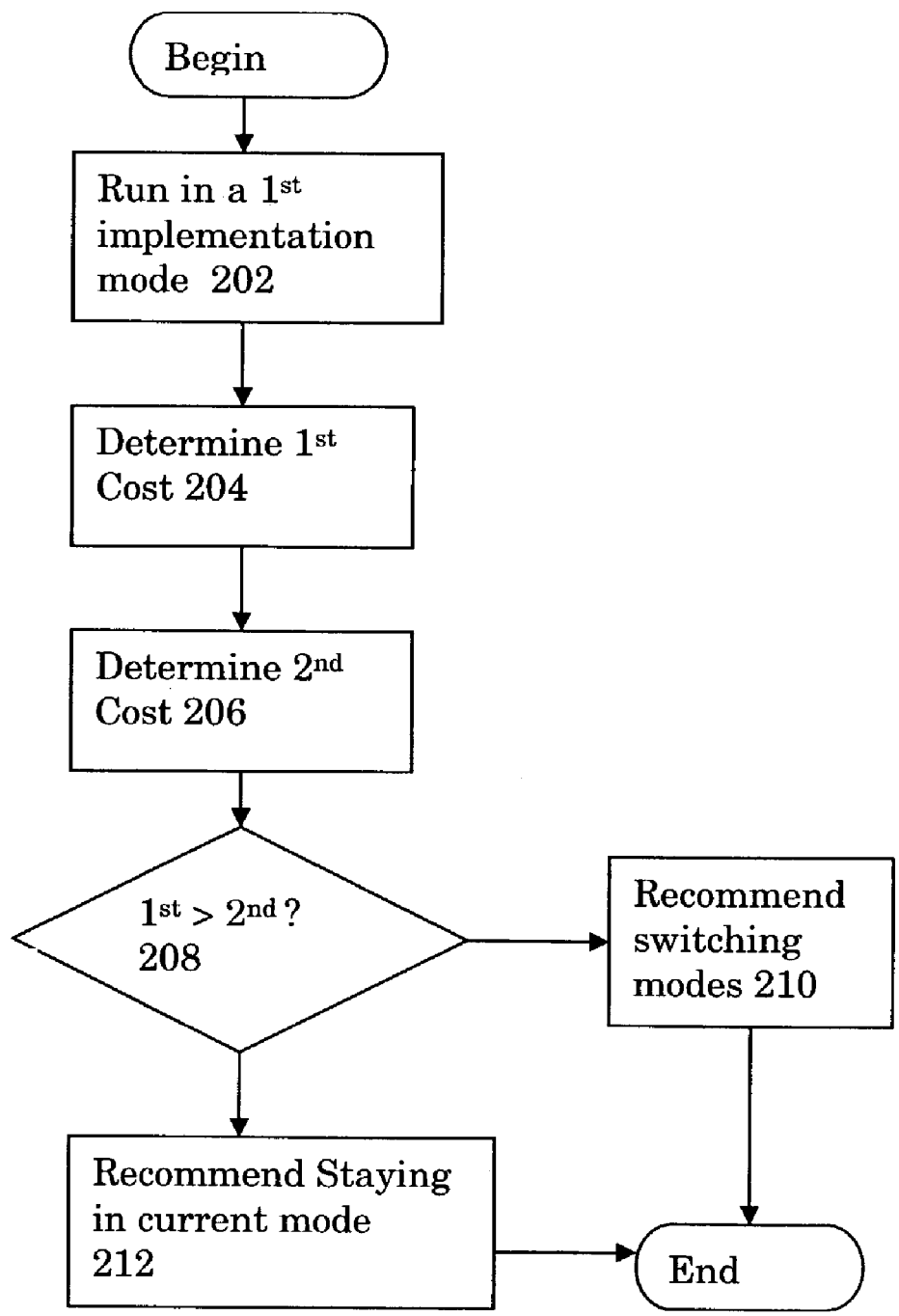
FIG. 3 shows a flowchart illustrating a method according to another embodiment of the invention.

Referring now to FIG. 3 there is shown a flowchart of a method 200 according to an embodiment of the invention. In step 202 the software component is running in a first implementation mode. In step 204 the component determines a first cost associated with operating in the first implementation mode. In step 206 the component determines a second cost. The second cost is associated with costs of switching to a second implementation mode (a constant, k) and costs associated with operating in the second implementation mode. These costs can be determined by either a client or by the server and preferably uses a cost matrix. In decision 208 the system (the server or at least one client) compares the first and second costs to determine whether the cost of switching modes merits the change. In step 210 the system uses the results of the determination of step 208 to recommend that the system changes the mode if the cost of switching merits the change. In step 212 the system recommends staying in the current mode if the change is not warranted. Based on predetermined or dynamically adjusted criteria, the system 100 determines whether to switch implementation mode. This method can be instantiated with the algorithm of FIG. 5 where impl1 can be the subscription implementation and impl2, the non-subscription implementation.

The decision to switch modes can be made either at the server 102 or at a client. The server 102 has all of the information required for switching the implementation mode of any client (i.e., software component). Alternatively, a client can make the decision as well. For example, a client in non-subscription mode can obtain the required information when doing a read from the server and receiving information on all of the writes performed by all of the clients along with the information requested by the read. We now provide more detailed examples of implementation of the general concepts of the invention.

For any two-implementation-component problem, let SC1=SwitchCost(impl1, impl2), SC2=SwitchCost (impl2, impl1), and let SC be the round trip switching cost SC+SC1+SC2. Given request r let $$reqCost = max_r |Cost(r, impl1) - Cost(r, impl1)|.$$

Let $\epsilon=2\cdot\text{Reqcost}/SC$. In this section we prove the following theorem:

Theorem 1: Algorithm Delta is $(3+\epsilon)$—competitive for any two-implementation-component problem. For a proof see Yellin, "Competitive Algorithms for the Dynamic Selection of Component Implementations," above at page 91.

Figure 4:
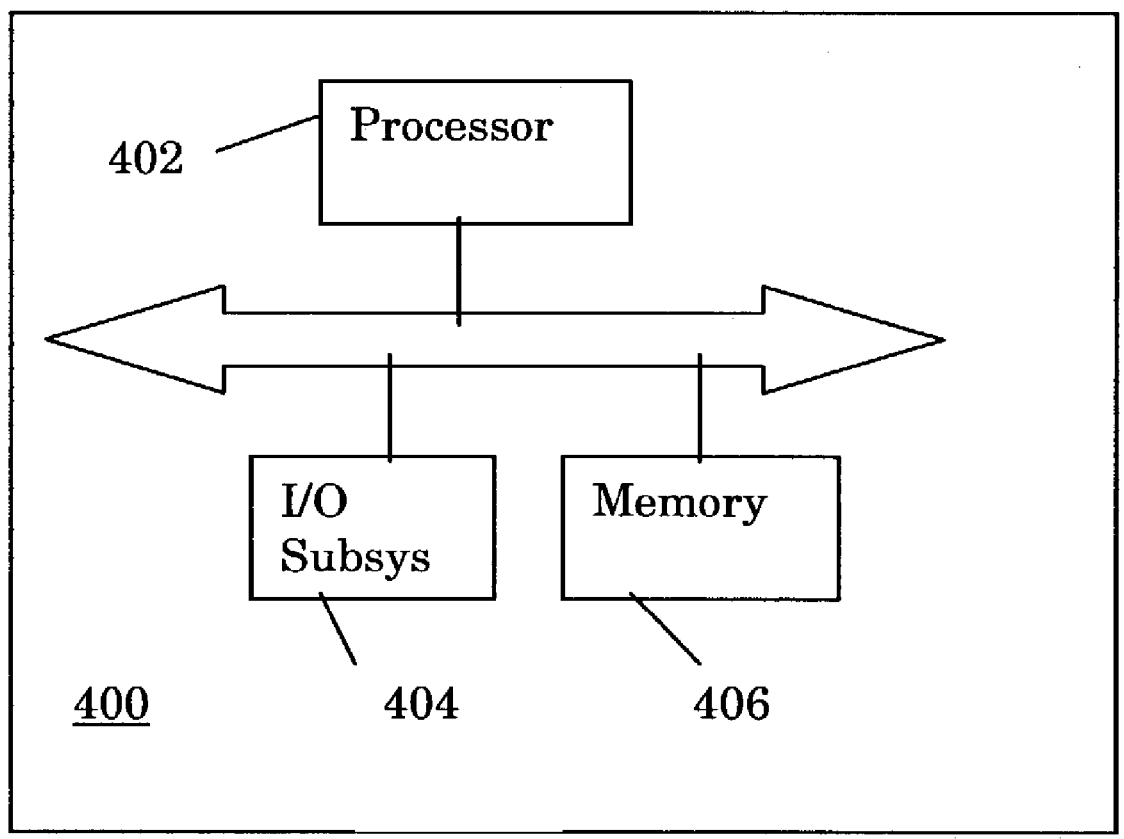
FIG. 4 shows a structural system for performing methods according to an embodiment of the invention.

Referring to FIG. 4 there is shown a simplified block diagram of an information processing system 400 suitable for use according to an embodiment of the invention. The system 400 comprises a processor or CPU 402 for executing instructions according to the invention. The instructions are stored in memory 406 or any computer readable medium, such as a compact disc. The input/output subsystem 404 comprises an interface with a user or other information processing system. The system 400 can also be implemented as a single application-specific integrated circuit (ASIC) comprising hard-wired logic for performing methods according to the invention.

I claim:

1. A runtime method for determining an implementation mode of operation for a software component, comprising steps of:
    a) running in a first implementation mode;
    b) determining a first cost associated with operating in the first implementation mode;
    c) determining a second cost associated with switching to a second implementation mode and with operating in the second implementation mode;
    d) comparing the first cost with the second cost; and
    e) providing a recommendation on whether to switch to the second mode based on the comparison of the first cost with the second cost.

2. The method of claim 1, wherein steps b) and c) each determine cost by using a cost matrix.

3. The method of claim 2 wherein the cost matrix lists the cost of executing an operation of a given type for each implementation mode.

4. The method of claim 2 wherein the cost matrix further lists the cost of switching from one implementation mode to another.

5. The method of claim 2, further comprising switching to the second implementation mode.

6. The method of claim 5, further comprising implementing the switching gradually over a period of time.

7. The method of claim 5, further comprising implementing the switching immediately.

8. The method of claim 1,wherein the software components operate within applications that read and write data from a centralized data base controlled by a server and steps b) and c) comprise determining the number of data base read operations by a particular application and the number of data base write operations performed by any application during a period of time, and the application is for operating in subscription and non-subscription modes wherein the subscription mode comprises maintaining a local replica of the data base.

9. The method of claim 8, further comprising the steps of:
    switching from the non-subscription mode to the subscription mode;
    informing the server of the switching; and
    discarding the local replica of the data base.

10. The method of claim 1 wherein the first mode is non-subscription.

11. The method of claim 1 wherein the software component is used with an application served by a server, and wherein:

step d) comprises determining whether the cost of read and write operations performed by the software component exceeds the cost of write operations performed by all software components also served by the server by at least a predetermined number, while the client is in non-subscription mode; and step e) comprises changing to the subscription mode when the determination of step d) is affirmative.

12. The method of claim 1 wherein the software component is used with an application served by a server, and step d) comprises determining whether the cost of write operations performed by all applications served by the server exceeds the cost of read and write operations by at least a predetermined number, while the client is in subscription mode; and step e) comprises changing to the non-subscription mode when the determination of step d) is affirmative.

13. The method of claim 1 further comprising the step of switching the mode of operation when the first cost exceeds the second cost by the cost of switching from one mode to another mode and switching back.

14. The method of claim 8 wherein the component is hosted by a client of the server that comprises a local replica of the data base and the method further comprises replicating data in increments, each time the application reads or writes data that is not already in its local replica.

15. A system comprising logic for:
    a) running in a first implementation mode;
    b) determining a first cost associated with running in the first implementation mode;
    c) determining a second cost associated with switching to a second implementation mode and with running in the second implementation mode;
    d) comparing the first cost with the second cost; and
    e) providing a recommendation whether to switch to the second mode based on the comparison of the first cost with the second cost.

16. The system of claim 15 wherein the logic comprises an application-specific integrated circuit.

17. A computer readable medium comprising computer readable instructions for:
    a) running in a first implementation mode;
    b) determining a first cost associated with running in the first implementation mode;
    c) determining a second cost associated with switching to the second implementation and running in the second implementation mode;
    d) comparing the first cost with the second cost; and
    e) providing a recommendation whether to switch to the second mode based on the comparison of the first cost.

18. In a data processing network comprising a software component comprising at least a first and second implementation a method comprising
    a) monitoring requests made to the software component;
    b) determining, based on the monitoring, whether processing of the requests can be improved by switching the operation of the software component from the first to the second implementation;
    c) informing the software component to switch to the second implementation if it is determined that the processing can be improved.

19. The method of claim 18 further comprising switching to the second implementation.

* * * * *